United States Patent [19]

Krtous

[11] 3,822,935

[45] July 9, 1974

[54] FILM FEED MECHANISM FOR REEL PROJECTORS AND THE LIKE

[75] Inventor: George F. Krtous, Chicago, Ill.

[73] Assignee: Bell & Howell Company, Chicago, Ill.

[22] Filed: Dec. 29, 1972

[21] Appl. No.: 319,570

[52] U.S. Cl................. 352/166, 242/192, 242/205
[51] Int. Cl. ............................................. G03b 1/00
[58] Field of Search ............ 352/166, 159, 14, 185; 242/192, 205

[56] References Cited
UNITED STATES PATENTS
2,838,304  6/1958  Berkenhoff...................... 352/159

Primary Examiner—Monroe H. Hayes
Attorney, Agent, or Firm—Coffee & Sweeney

[57] ABSTRACT

A film projection apparatus which has a film supply reel and a projection station located at a film gate where the film is moved intermittently past the projection station. A film feed mechanism is operatively associated with the film supply reel to positively feed film from the reel toward the projection station in pulsations to provide sufficient slack in the film so that the film is not required to be pulled directly off of the supply reel by the film moving mechanism at the film gate. In one form of the invention the film supply reel is intermittently rotated in response to tension in the film as it leaves the reel whereby the film feed pulsations are at a frequency which is a function of such tension. In another form of the invention eccentric cam means intermittently rotate the film supply reel whereby the film feed pulsations are at a frequency which is a function of the speed of the film feed itself.

20 Claims, 5 Drawing Figures

PATENTED JUL 9 1974 3,822,935

FILM FEED MECHANISM FOR REEL PROJECTORS AND THE LIKE

BACKGROUND AND SUMMARY OF THE INVENTION

This invention relates to threaded film devices and more particularly to sprocketless type moving picture projectors.

In moving picture projectors a series of pictures or frames from a film is projected onto a suitable viewing surface. This is done by driving the film past a film gate in an intermittent motion. Each frame is held stationary in the film gate during the time when it is projected upon the viewing surface. Although a person viewing the projected pictures actually sees a series of individual scenes, his persistence of vision permits him to interpret the series of pictures as though he were viewing the objects in the scene undergo normal motions.

Normally, to provide such intermittent motion of the film past the film gate, the film is perforated along at least one edge and is intermittently driven past the film gate by means of a generally reciprocating shuttle member. The shuttle member has a tooth which is adapted to engage with the perforations in the film only during motion of the shuttle in the direction in which it is desired to intermittently move the film.

Most film handling devices have a supply reel and a take-up reel. Usually some type of a constant speed device is employed for rotating the take-up reel so that the film may be wound thereon after it has been moved past the film gate. It is also common for a moving picture projector to have constantly driven sprockets mounted both before and after the film gate. The teeth of the sprockets are adapted to engage with the perforations in the film so that the constantly driven sprockets can aid in feeding the film to the film gate prior to projection or, in removing the film gate after its pictures have been projected. One of the major problems that is encountered in such sprocket-type of film driving mechanism is that there must be a transition between the constant speed imparted to the film by the sprockets or the take-up reel and the intermittent motion past the film gate caused by the reciprocating shuttle mechanism. For many years the solution to this problem was to provide loops of film between the sprockets and the film gate. In this manner, for the pre-gate film loop, for example, the film can be delivered to the loop at a constant speed by the sprocket and intermittently withdrawn from the loop by the shuttle. Any differences between the instantaneous speeds of the film at the sprocket or the film gate are absorbed by a change of size in the loop. Loop forming mechanisms, therefore, have become customary and necessary parts of most moving picture projectors.

The sprockets on the projector just described are looked upon by those skilled in the art as necessary evils. This is especially true in the case of automatically threaded moving picture projectors wherein the spacing and timing between the various sprockets and the shuttle must be very precise in order that all of the various sprockets and shuttle teeth are in alignment with the perforations in the film at any given time.

In order to avoid the use of sprockets, many attempts have been made to pull the film from the supply reel by means of the shuttle teeth alone, the film entering the film gate merely passing over a series of idler rollers located between the supply reel and the film gate. These attempts have generally been unsatisfactory, particularly, with film reels having a large capacity, for two reasons. First, the film has tended to be jerked off of the supply reel, causing the film tension upon entry into the film gate to vary considerably whereby the film "bounces" and the projected picture is either unpleasant to view or wholly unintelligible. Second, the stresses placed upon the film perforations cause the perforations to rip.

In addition, sprocketless moving picture projectors have been designed with sprocketless guide means on the projector between the supply reel and the film gate. The guide means normally is biased so as to tend to pull the film from the supply means or to pull the film from the film gate depending upon the various tensions in the film.

This invention is directed to a new and improved, simple to manufacture, efficient and reliable means for positively feeding film from the supply means therefore in a moving picture projector to the film gate with sufficient slack in the film so that the film does not have to be pulled directly from the supply means by the shuttle at the film gate.

More particularly, in one form of the invention, an eccentric cam member is mounted for rotation with the film supply reel as the film is fed off of the reel. As the reel is rotated, the eccentric cam member is brought into engagement with a constantly driven member, such as a roller or gear, so that the supply reel is positively driven during only a portion of each of its revolutions. The resulting intermittent driving pulsations of the supply reel loosens the outer convolutions of film on the supply reel, positively feeds the film from the reel, and thereby provides frictionless type feeding of the film to the shuttle mechanism at the film gate. In the exemplary embodiment the eccentric cam member is formed on the spindle for the film supply reel.

In another form of the invention, a constantly driven member is engageable by the film as it leaves the supply reel and sufficient film tension will cause the constantly driven member to be moved and brought into engagement with a concentric member on the spindle which is keyed to the supply reel to provide for the aforementioned intermittent driving pulsations of the supply reel to positively feed the film to the film gate.

It is, therefore, the principal object of this invention to provide a new and improved film feed-mechanism between the film supply means of a film projection apparatus and the projection station therefor located at a film gate.

Other objects, features and advantages of the invention will be apparent from the following detailed description taken in connection with the accompanying drawings.

DETAILED DESCRIPTION OF THE INVENTION

Figure 1:
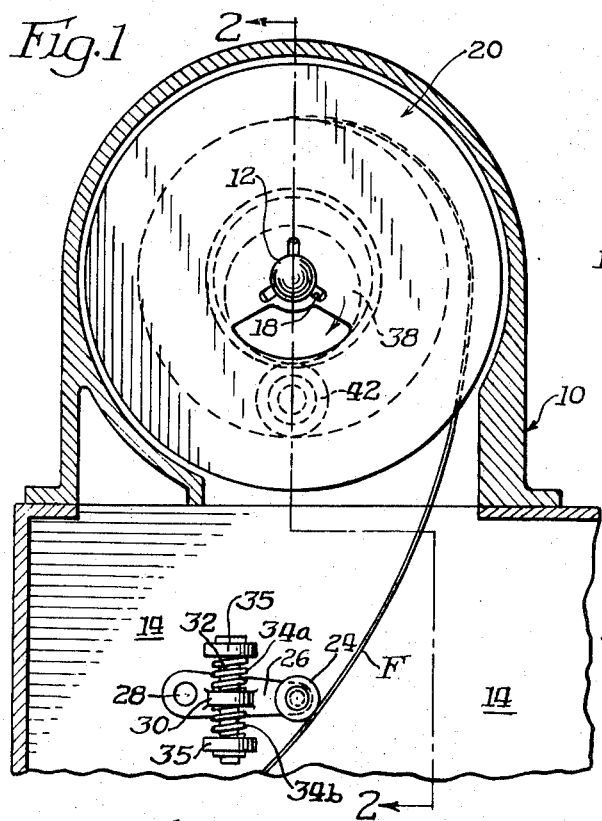
FIG. 1 is a generally front elevational view of one form of film feed mechanism made in accordance with the concepts of the present invention.
Figure 2:
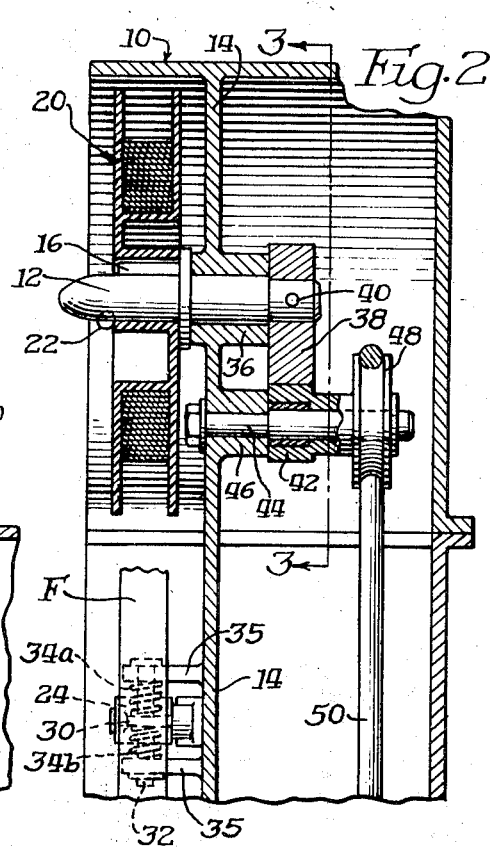
FIG. 2 is a vertical section taken generally along the line 2—2 of FIG. 1.
Figure 3:
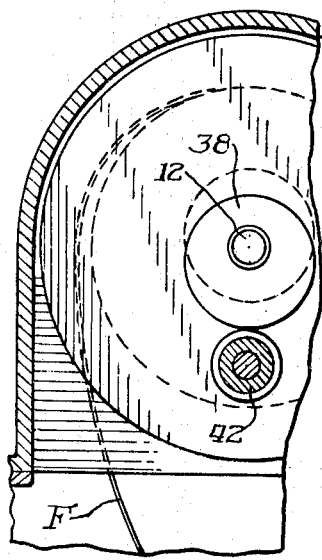
FIG. 3 is a partial vertical section taken generally along the line 3—3 of FIG. 2.

Referring to the drawings in greater detail, and first to FIGS. 1 through 3, the film feed mechanism of the present invention is designed particularly for use with film projection apparatus such as moving picture projectors having a film supply means and a projection station located at a film gate with means such as a shuttle mechanism located at the film gate to move the film generally intermittently past the projection station. As is apparent from the drawings, the projection station, film gate, shuttle mechanism and related components are not shown, but reference can be made to U.S. Pat. No. 3,331,541 to J. Cherniavsky et al., entitled "Sprocketless Projector," which issued on July 18, 1967 to the assignee of the present invention. That patent is incorporated herein by reference to show any of the aforementioned details which may be deemed necessary.

Referring specifically to FIGS. 1 through 3, a projector housing, generally designated 10, is provided with a film supply reel spindle 12 which is freely rotatably journalled in an interior frame panel 14 of the projector housing. The spindle 12 has at least one radially protruding key 16 which is receivable in slots 18 (FIG. 1) of a standard film supply reel, generally designated 20. The film supply 20 is adapted to receive film F in standard convoluted fashion. The film supply reel is held onto the spindle 12 by a spring loaded detent ball 22 (FIG. 2).

When the projector is threaded, the film passes from the supply reel 20 over a snubber roller 24 (FIG. 1) rotatably mounted on one end of an arm 26 which is pivoted at its opposite end 28 to the frame panel 14. An ear 30 protrudes horizontally from the side of the arm 26 and is slidably mounted on a vertical shaft 32 between two springs 34a and 34b by means of an aperture in the ear 30. The shaft 32 is mounted between brackets 35.

As seen best in FIG. 2, the film supply reel spindle 12 protrudes through a boss portion 36 of the frame panel 14 and has an eccentric circular cam member 38 fixed thereto, as by a pin 40, for rotation with the spindle and the film supply reel 20 mounted on the spindle. Immediately below the cam member 38 is a constantly driven roller 42 which is rotatably mounted on a shaft 44 which extends through another boss portion 46 of the frame panel 14. The roller 42 is fixed for rotation with a pulley member 48 which is constantly rotatably driven by a belt 50 which is operatively associated with appropriate driving mechanism of the projector. The eccentric cam member 38 and/or the roller 42 may be provided with gear teeth to facilitate the driving relationship therebetween.

FIGS. 1 through 3 show that the eccentric cam member 38 and the roller 42 are so positioned and are of sizes so that the cam member engages the constantly driven roller only during a portion of each revolution of the spindle 12 and the film supply reel 20 mounted thereon. Thus, when the supply reel 20 is initially rotated by the film F, the eccentric cam member 38, at some point in each revolution thereof, is brought into engagement with the constantly driven roller 42 so that the roller will positively rotate the cam member and spindle 12 and, thus, film supply reel 20 through a partial revolution. This positive intermittent driving pulsation of the spindle and film supply reel loosens the outer convolutions of the film and positively drives the film toward the film gate of the projector, over snubber roller 24. As the film again tightens against the spring 34a, the film supply reel is again moved such that the cam member 38 and roller 42 come into contact and the cycle is repeated. As the projector proceeds to continuously operate, this positive driving pulsating motion of the supply reel supplies sufficient slack in the film so that practically frictionless feeding of the film to the film gate is accomplished so that the film need not be pulled from the supply reel by the shuttle means at the film gate. The aforementioned "bouncing" of the film and the stress placed on the film by known devices is eliminated.

Figure 4:
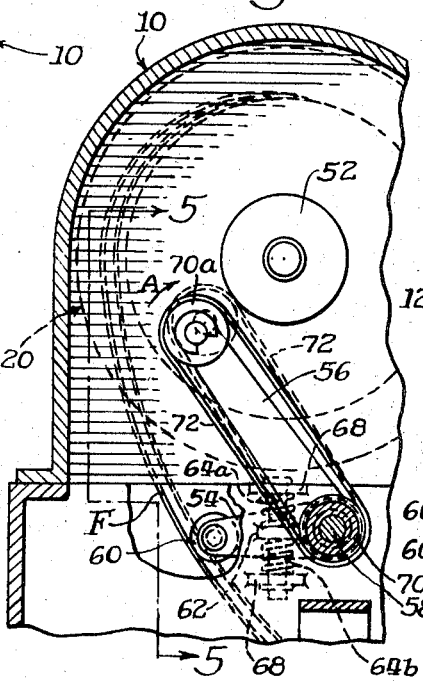
FIG. 4 is a partial elevational view of another form of the invention.
Figure 5:
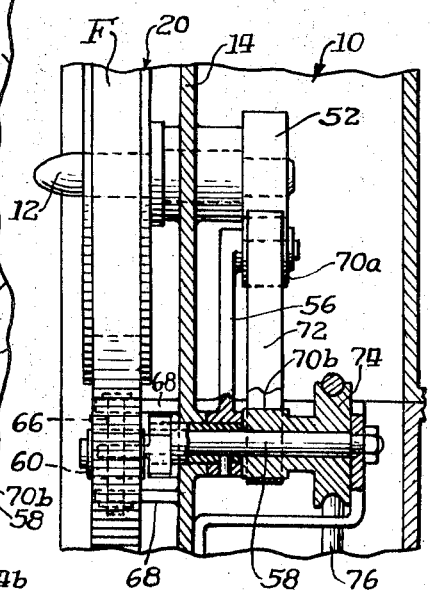
FIG. 5 is a partial vertical section taken generally along the line 5—5 of FIG. 4.

FIGS. 4 and 5 show another form of the invention and like numerals are applied where the structure is similar to that described in relation to FIGS. 1 through 3. In this form of the invention, the eccentric cam member described above is replaced by a concentric member 52 fixed for rotation with the spindle 12. An offset bell crank member having a first arm 54 and an offset second arm 56 is pivotally mounted to the frame panel 14 by means of a shaft 58. A snubber roller 60, engageable by the film F, is rotatably mounted on the free end of the arm 54 of the bell crank. An ear 62 protrudes horizontally from the side of the arm 54 and is sandwiched between a pair of springs 64a and 64b on a shaft 66 mounted between bracket ears 68 (FIG. 5). The other arm 56 of the bell crank member has a pair of pulley members 70a and 70b about which is wrapped a constantly driven belt 72. As best seen in FIG. 5, pulley 70b is formed integral with a larger outer pulley 74 which is constantly rotated by a belt 76 which is operatively associated with the appropriate driving mechanism of the projector. Thus, as the projector is operated, the belt 72 is constantly rotated about pulleys 70a and 70b.

With the structure of FIGS. 4 and 5, as best seen by the dotted lines in FIG. 4, sufficient tension on the film F will cause the entire bell crank member (comprising arms 54 and 56) to pivot in the direction of arrow A against the biasing of spring 64a until the belt 72 comes into engagement with the concentric member 52 on the spindle 12. The spindle and a film supply reel mounted thereon will then be rotated to positively feed film off of the reel until the tension in the film is relieved and the bell crank pivots opposite arrow A and belt 72 comes out of contact with member 52. As with the structure shown in FIGS. 1 through 3, the positive driving of the film is only during a portion of one revolution of the film, or until the outer convolutions of the film are loosened and the film is positively driven from the reel. Also, as with the structure shown in FIGS. 1 through 3, an intermittent pulsating driving motion is imparted to the film supply reel and, again, the stresses between the shuttle mechanism and the film perforations at the film gate are relieved.

It is apparent that with both of the embodiments shown herein, the intermittent driving pulsations of the film supply reel (or the frequency thereof) are a function of the movement of the film past the projection station which results in the movement of the film off of the supply reel. With the embodiment shown in FIGS. 1 through 3, since the eccentric cam member 38 rotates with the film supply reel, the pulsations are a direct function of the speed of the film feed itself, namely the speed at which the film supply reel is rotated. With the structure shown in FIGS. 4 and 5, the pulsations are a direct function of the tension in the film as it leaves the film supply reel.

The foregoing detailed description has been given for clearness of understanding only and no unnecessary limitations should be understood therefrom as some modifications will be obvious to those skilled in the art.

I claim:

1. In a film projection apparatus having a film supply means and a projection station located at a film gate with means remote from said supply means located at the film gate to move the film past the projection station, a film feed mechanism comprising: continuous drive means independent of the supply means intermittently engageable with a component of said film supply means for positively driving said film supply means in a film feed direction intermittently in pulsations only during a given portion of each cycle of operation of said supply means to feed film positively off of said supply means toward said projection station and thereby provide sufficient slack in the film so that the film is not pulled directly from the supply means by the film moving means at said film gate whereby forces from said drive means for driving the supply means are not applied to the film.

2. The apparatus of claim 1 wherein said film feed mechanism includes means effecting said pulsations at a frequency which is a function of the speed of the film feed itself.

3. The apparatus of claim 1 wherein said film feed mechanism includes means effecting said pulsations at a frequency which is a function of the tension in the film as it leaves the film supply means.

4. The apparatus of claim 1 wherein said film supply means includes a rotatable film supply reel which is rotated by said film feed mechanism in pulsations the frequency of which is a function of the speed of rotation of the reel.

5. The apparatus of claim 4 wherein said film feed mechanism includes cam means which is eccentric with respect to the axis of rotation of said film supply reel.

6. The apparatus of claim 1 wherein said film supply means includes a rotatable film supply reel which is rotated by said film feed mechanism and including means operatively associated with said supply reel to rotate the same only during at least one given portion of each revolution of the reel to provide said pulsations.

7. The apparatus of claim 6 including driven means brought into operative engagement with the film supply reel only during said portions of its revolutions.

8. The apparatus of claim 1 wherein said film supply means includes a rotatable film supply reel which is rotated by said film feed mechanism in pulsations the frequency of which is a function of the tension in the film as it leaves the film supply reel.

9. The apparatus of claim 8 wherein said film feed mechanism includes constantly driven means which is movably mounted and brought into driving engagement with means operatively associated with the film supply reel by tension in said film.

10. The apparatus of claim 9 wherein said film feed mechanism includes a bell crank member having a first arm portion engageable by the film and a second arm portion having at least a portion of said driven means thereon, the bell crank member being pivotally mounted so as to swing said portion of the driven means on said second arm portion into driving engagement with said means operatively associated with the film supply reel when the tensed film engages said first arm portion.

11. The apparatus of claim 10 wherein said driven means comprises a belt and said second arm has pulley members mounted thereon and about which said belt is wrapped.

12. The apparatus of claim 1 wherein said film feed mechanism is operative as a function of the movement of the film past said projection station.

13. In a film projection apparatus having a film supply means including a rotatable film supply reel, and a projection station located at a film gate with means located at the film gate to move the film past the projection station, a film feed mechanism comprising: cam means operatively associated with said film supply reel for rotation therewith, and a constantly driven member engageable with said cam means only during at least one portion of each revolution of said reel to positively rotate the reel only during said portions whereby the film is positively fed from the film supply reel toward the projection station intermittently in pulsations to provide sufficient slack in the film so that the film is not pulled directly from the supply reel by the film moving means at said film gate.

14. The apparatus of claim 13 wherein said driven member comprises a roller having a fixed axis of rotation spaced from the axis of rotation of said reel whereby said eccentric cam means is brought into operative engagement with the roller during said portion of each revolution of the reel.

15. In a film projection apparatus having a film supply means and a projection station located at a film gate with means remote from said supply means located at the film gate to move the film past the projection station, a film feed mechanism comprising: continuous drive means independent of the supply means intermittently engageable with a component of said film supply means for positively driving said film supply means in a film feed direction to feed film positively from said supply means toward said projection station without applying forces to the film by the drive means and only when there is a predetermined tension in the film at a predetermined point between the film supply reel and the projection station so as to drive the supply means only during a given portion of each cycle of operation of said supply means so that the film is not pulled directly from the supply means by the film moving means at said film gate.

16. The apparatus of claim 15 wherein said film supply means includes a rotatable film supply reel which is rotated by said film feed mechanism, and constantly driven means which is movably mounted and brought into driving engagement with means operatively associated with the film supply reel by tension in said film.

17. The apparatus of claim 16 wherein said film feed mechanism includes a bell crank member having a first arm portion engageable by the film and a second arm portion having at least a portion of said driven means thereon, the bell crank member being pivotally mounted so as to swing said portion of the driven means on said second arm portion into driving engagement with said means operatively associated with the film supply reel when the tensed film engages said first arm portion.

18. The apparatus of claim 17 wherein said driven means comprises a belt and said second arm has pulley members mounted thereon and about which said belt is wrapped.

19. In a film projection apparatus having a film supply reel and a projection station located at a film gate with means located at the film gate to move the film past the projection station, a film feed mechanism comprising: continuous drive means independent of the supply reel intermittently engageable with a component of said film supply reel for positively driving said film supply reel in a film feed direction only during at least one given portion of each revolution of said reel to feed film positively off of said supply reel towards said projection station and thereby provide sufficient slack in the film so that the film is not pulled directly from the supply reel by the film moving means at said film gate and whereby forces from the drive means for driving the supply reel are not applied to the film.

20. In a film projection apparatus having a film supply reel and a projection station located at a film gate with means located at the film gate to move the film past the projection station, a film feed mechanism comprising: means operatively associated with said film supply reel for positively feeding film from said supply reel toward said projection station only during at least one given portion of each revolution of said reel, said film feeding means including eccentric cam means disposed for rotation with the film supply reel and a driven member in the form of a roller having a fixed axis of rotation spaced from the axis of rotation of the film supply reel and spaced relative to said eccentric cam means whereby the eccentric cam means is brought into operative engagement with the roller during said portion of each revolution of the reel.

* * * * *

UNITED STATES PATENT OFFICE
CERTIFICATE OF CORRECTION

Patent No. 3,822,935          Dated July 9, 1974

Inventor(s) GEORGE R. KRTOUS

It is certified that error appears in the above-identified patent and that said Letters Patent are hereby corrected as shown below:

Column 1, line 38, after "film" insert --from the film--.

Signed and sealed this 19th day of November 1974.

(SEAL)
Attest:

McCOY M. GIBSON JR.          C. MARSHALL DANN
Attesting Officer          Commissioner of Patents